(12) United States Patent
Karras

(10) Patent No.: US 11,617,351 B2
(45) Date of Patent: Apr. 4, 2023

(54) PET TREAT HOLDER AND SAFETY DEVICE

(71) Applicant: Vasiliki Karras, Granite Bay, CA (US)

(72) Inventor: Vasiliki Karras, Granite Bay, CA (US)

( * ) Notice: Subject to any disclaimer, the term of this patent is extended or adjusted under 35 U.S.C. 154(b) by 14 days.

(21) Appl. No.: 17/210,378

(22) Filed: Mar. 23, 2021

(65) Prior Publication Data

US 2021/0204519 A1 Jul. 8, 2021

Related U.S. Application Data

(63) Continuation-in-part of application No. 16/270,698, filed on Feb. 8, 2019, now Pat. No. 11,000,014.

(60) Provisional application No. 62/710,721, filed on Feb. 26, 2018.

(51) Int. Cl.
*A01K 15/02* (2006.01)

(52) U.S. Cl.
CPC .................................. *A01K 15/026* (2013.01)

(58) Field of Classification Search
CPC .... A01K 15/02; A01K 15/025; A01K 15/026; A01K 5/0114; A01K 5/0135; A01K 5/0142; A47K 10/42; A47K 10/421; A47K 10/422; A47K 10/423; A47K 10/424; A47K 10/425; A47K 10/426; A47K 10/427; A47K 2010/3233; B65D 83/0805

USPC ....... 119/707, 708–710; 221/221, 45–50, 56, 221/57, 64; D30/160
See application file for complete search history.

(56) References Cited

U.S. PATENT DOCUMENTS

| | | | |
|---|---|---|---|
| 5,813,366 A * | 9/1998 | Mauldin, Jr. | A01K 15/025 119/710 |
| 6,905,025 B2 * | 6/2005 | Morin | B65D 83/0805 221/48 |
| 7,555,997 B2 * | 7/2009 | Wolfe, Jr. | A01K 15/025 119/707 |
| D658,825 S * | 5/2012 | Wolfe, Jr. | D30/160 |
| D840,610 S * | 2/2019 | Toolan | D30/160 |
| 2013/0074780 A1 * | 3/2013 | Wechsler | A01K 15/026 119/710 |
| 2016/0255812 A1 * | 9/2016 | Wolfe, Jr. | A01K 15/025 |

* cited by examiner

*Primary Examiner* — William V Gilbert

(57) ABSTRACT

A single piece pet treat holder. The holder having an outer perimeter shape with a first thickness. An inner perimeter shape having an opening with a central aperture located therein. The opening extending through the first thickness and having a plurality of flexible projections extending toward the central aperture. Each of the flexible projections terminating in an enlarged tip. The flexible projections and the enlarged tips are configured to restrict removal of an object when the object is twisted in a first direction through the opening. The flexible projections and the enlarged tips are configured to release the object when the object is twisted in a second direction opposite the first direction.

20 Claims, 4 Drawing Sheets

PET TREAT HOLDER AND SAFETY DEVICE

CROSS REFERENCE TO RELATED APPLICATIONS

This application is a Continuation in part Non-Provisional application and claims priority to U.S. Non-Provisional application Ser. No. 16/270,698 filed Feb. 8, 2019, which claims priority to U.S. Provisional Application Ser. No. 62/710,721 filed Feb. 26, 2018, the contents of all of which are hereby incorporated by reference herein in their entirety into this disclosure.

TECHNICAL FIELD

The subject disclosure relates to employing toys as treat holding devices, and in particular to providing a device that can be used as a fetch toy as well as a safety device that renders chew sticks safe for dogs.

BACKGROUND

Pet treats are generally rigid in nature, such as for example: bully sticks, raw hide sticks, deer antler, and treat sticks that are bone-like. These treats are consumable by dogs and pose a health hazard when eating these treats. Dogs will chew on these treats until they can fit the entire treat in their mouth, then prematurely swallow the treat whole, the size being much larger than they are able to safely swallow. Unfortunately, this large piece swallowed can result in the dog choking and/or stomach blockage due to ingestion of a large piece of the treat stick. The emergency cost to pet owners when their dogs swallow a large piece of treat stick can be substantial.

Treat holders currently on the market are not dog friendly or safe. The massive strength of a canine's jaw can destroy conventional treat holders. Problems are exacerbated by those conventional holders because they typically have too many parts that the dog will bite down into various loose parts, which then become a safety hazard.

Thus, there is a need for a strong, durable treat holder that can safely withstand the strong bite of a powerful canine.

SUMMARY OF THE SUBJECT DISCLOSURE

The present subject disclosure presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

While various aspects, features, or advantages of the subject disclosure are illustrated in reference to a pet treat holder, such aspects and features also can be exploited for various other animals to prevent choking.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

In one exemplary embodiment, the present subject disclosure is a single piece pet treat holder. The holder having an outer perimeter shape with a first thickness. An inner perimeter shape having an opening with a central aperture located therein. The opening extending through the first thickness and having a plurality of flexible projections extending toward the central aperture. Each of the flexible projections terminating in an enlarged tip. The flexible projections and the enlarged tips are configured to restrict removal of an object when the object is twisted in a first direction through the opening. The flexible projections and the enlarged tips are configured to release the object when the object is twisted in a second direction opposite the first direction.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Figure 1:
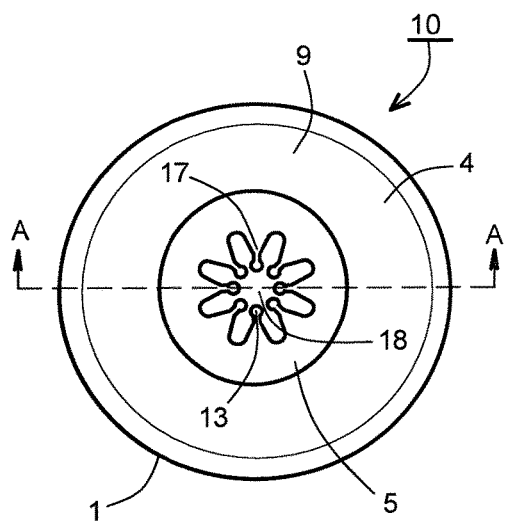
FIG. 1 illustrates a front view of the pet treat holder according to this subject disclosure.

Particular embodiments of this subject disclosure will now be described in greater detail with reference to the figures.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

Various exemplary embodiments of the subject disclosure are presented throughout the figures. Multiple perspective views of a pet treat holder according to an exemplary embodiment of the present subject disclosure are presented in various embodiments.

Figure 2:
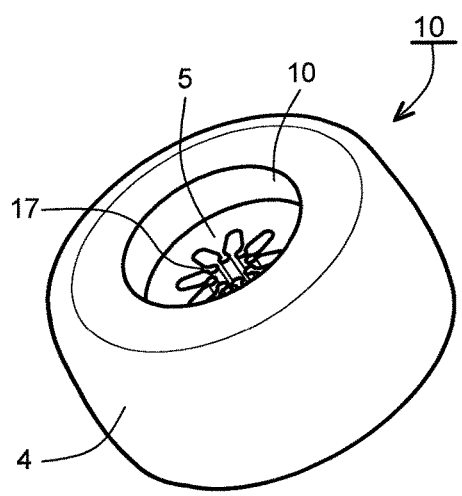
FIG. 2 is a top perspective view of the pet treat holder.
Figure 8:
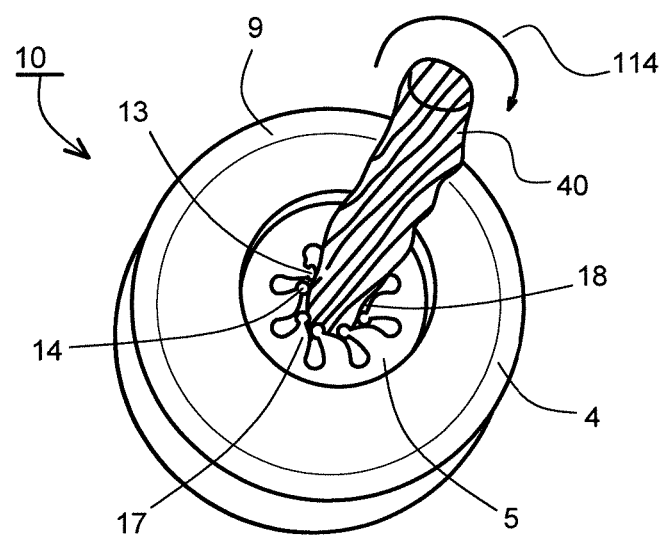
FIG. 8 illustrates a front perspective view of the pet treat holder with a treat inserted.
Figure 9:
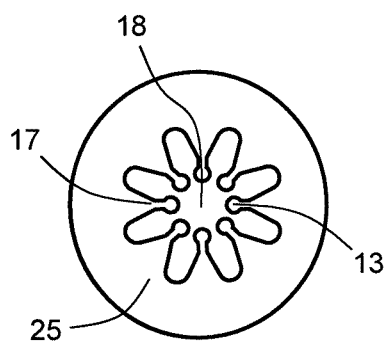
FIG. 9 is a front view of the center insert at rest.

FIGS. 1-2 and 8 show a pet treat holder 10 according to the present subject disclosure. The holder 10 has an outer housing 4 and a center portion 5. Various advantages are embodied by the construction of the holder 10. That is, in addition to rigid or semi rigid straight stick-shaped treats, the holder 10 can be attached to many different shapes of treats, such as curved, spiral, other obtuse shapes due to its flexible center portion 5. The holder 10 itself is constructed as a chew toy that will provide the pet lasting enjoyable entertainment.

The holder 10 can be made of a single integral or unitary part. That is, the outer housing 4 and the center portion 5 are constructed as a single unitary construction. The holder 10 may be mold injected as a single part as shown in perspective cross section view in FIGS. 11-16. Pet owners will benefit from the holder 10 construction by being able to keep their pets safe while consuming chew sticks that have been known to cause a hazard when ingested by dogs.

Alternatively, the holder may be made of two or more parts such as shown in the holder 100 in FIGS. 3-7. The various pieces of the multipiece holder 100 is connected to each other by a variety of methods, such as by co-molding, over-molding, fusing and/or any other suitable process for connecting two or more parts to form a single integral or unitary part. As a two-piece holder 100, the holder 100 may include an outer housing 4 having a center insert 25. When molded together during manufacturing, the holder 100 is adapted for use with dog treats of various shapes from semi-rigid, straight, curved, spiral or other shape dog treats according to this subject disclosure.

The holder 10 may be made of various non-toxic materials, such as a rubber, an elastomer, natural rubbers, styrene-butadiene block copolymers, polyisoprene, polybutadiene, ethylene propylene rubber, ethylene propylene diene rubber, silicone elastomers, fluor elastomers, polyurethane elastomers, nitrile rubbers and/or any other suitable material that is very durable and having high-density qualities capable of taking strong pressure from a bite from a large canine. The material selected may also be made of a non-toxic material having a material strength that can securely hold a pet treat within the holder 10 without being a hazard to the pet itself. Pet owners benefit in keeping their dogs safe while consuming a chew sticks that has previously been known to cause a choking hazard when prematurely ingested by dogs.

As shown in the figures, the holder 10, 100, 200, 300, 400, 500, 600 may take a variety of different shapes and/or sizes. The outer housing 4 may be round, circular such as a toroid, square, rectangular, triangular, made to resemble a particular object, such as a bone, a flower, a mouse and/or any other suitable shape according to this subject disclosure.

The center portion 5 may also take a variety of different shapes and/or sizes. The center portion 5 may be also round, square, rectangular, triangular, made to resemble a particular object and/or any other suitable shape according to this subject disclosure.

The outer housing 4 may be made from a stronger and harder material then the center portion 5. For example, the outer housing 4 can be composed of a more durable rubber, or other flexible material, having a higher durometer. The center portion 5 may be made of a flexible material having a lower durometer.

Figure 3:
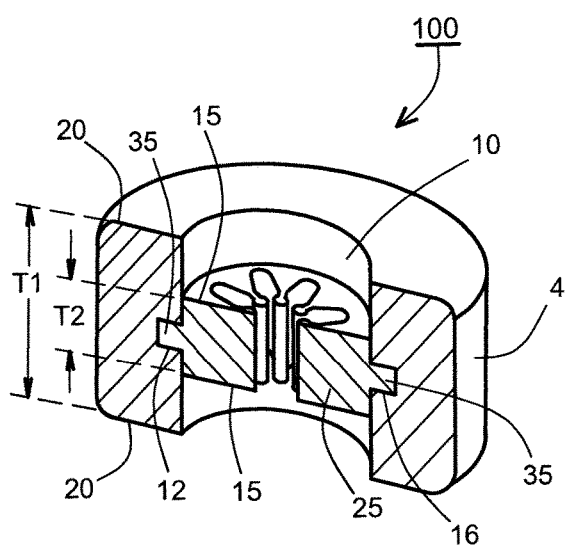
FIG. 3 is a perspective cross section view at A-A in FIG. 1 of the pet treat holder.
Figure 4:
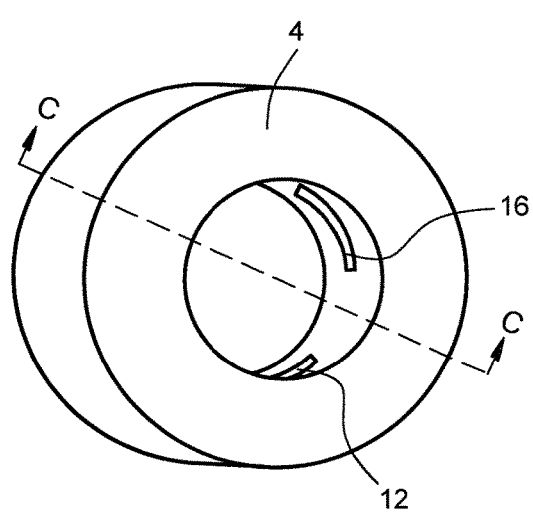
FIG. 4 is a front perspective view of the outer housing.

FIG. 3 shows an embodiment in which the holder 100 is a two-part construction. In particular, the center insert 25 is shown recessed or countersunk inward of a first thickness (T1) of the outer housing 4 so that outer surfaces 15 of the center insert 25 are recessed and not flush with outer surfaces 20 of the outer housing 4. A second thickness (T2) of the center insert 25 is thinner than a first thickness (T1) of the outer housing 4. The outer surfaces 15 of the second thickness (T2) of the center insert 25 may be placed at a predetermined countersunk depth 10 below a highest point on the outer surfaces 20 of the outer housing 4 so that a pet cannot easily reach the center insert 25 that is holding the object 40 with a sufficient strong rotational counterforce that is clamping the object in place. The center insert 25 is a solid, durable and flexible portion.

Figure 5:
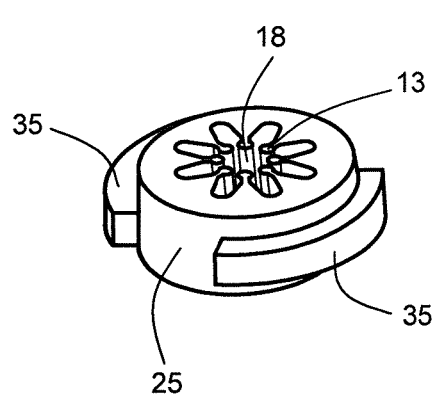
FIG. 5 is a top perspective view of the center insert.
Figure 6:
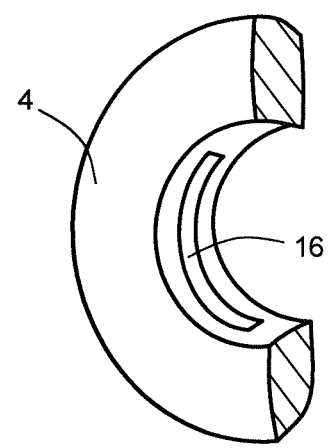
FIG. 6 is a front perspective cross section view at B-B in FIG. 4 of the outer housing.
Figure 7:
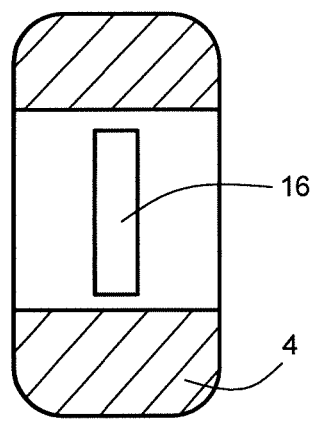
FIG. 7 is a side cross section view at B-B in FIG. 4 of the outer housing.

FIGS. 3-7 illustrate the holder 100 being constructed as a two-piece holder 100 in which the center insert 25 is disposed in the outer housing 4 during manufacturing. In FIGS. 3 and 5, the center insert 25 is shown having tabs 35 disposed thereon. The tabs 35 may be manufactured with the center insert in a single mold. Alternatively, the tabs 35 may be integrated as part of the center insert 25 in a variety of different ways, such as over-molded, bonded or any other suitable process during the manufacturing process. In assembly of the holder 100, the tabs 35 are inserted into inner circular openings 12, 16 (FIG. 4) of the outer housing 4. Although shown as two tabs 35, it is possible to have one or many tabs.

FIGS. 1, 3, 5 and 8-9 show the center insert 25 having a plurality of solid projections 17 centrally located. The projections 17 point radially inwards towards a centermost opening 18. Each of the projections 17 narrows or tapers inward toward the centermost opening 18. Each of the projections 17 has an enlarged end 13 at its outermost, radially inward end. Although described as a centermost opening, it is to be understood that the opening 18 may be positioned offset from the center according to this subject disclosure.

Figure 14:
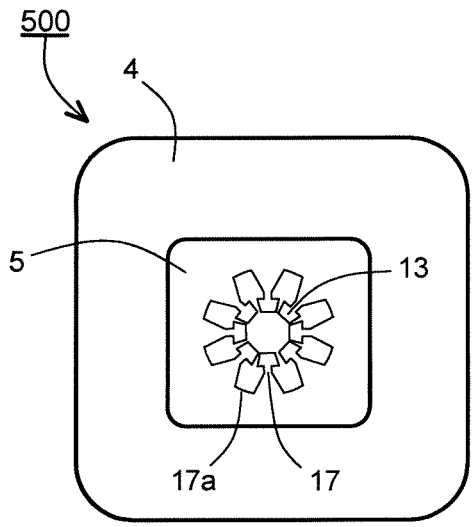
FIG. 14 is a front view of a single piece construction of the pet treat holder according to a fifth embodiment of the subject disclosure.

FIGS. 1 and 14 show that the enlarged ends 13 may take a variety of different sizes and/or shapes. For example, the proximal or radially inward enlarged ends can be round, beaded, square, diamond and/or any shape suitable to grip an object 40 inserted into the centermost opening 18. The mass of the enlarged ends 13 is wider than the radially inward tip of the projections 17. Furthermore, the enlarged ends 13 are adapted to increase a grip strength or rotational counterforce that secures the projections 17 around an object 40 as the object 40 is wedged into and twisted into the centermost opening 18 such as shown in FIG. 8.

Figure 10:
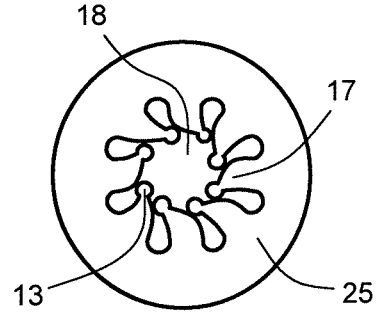
FIG. 10 is a front view of the center insert in a twisted configuration.

FIG. 8 shows the holder 10 in use. A solid object 40, such as a chew stick, can be inserted and securely held inside of the centermost opening 18. With the application of repeated twisting and wedging the object 40 into the centermost opening 18, a pushing torque is input by the pet owner pushing the object into the opening 18. The aggressive twisting action of the object 40 into the opening 18 of the holder 10 is similar to screwing a lag bolt into a solid material. With increased force and torque, the object 40 travels further through the holder 10 and locks into the holder 10 more securely. Through the rotational forces of compression and friction caused by twisting, the tips or enlarged ends 13 of the projections 17 deflect to one side 14, as shown in FIGS. 8 and 10. These increased internal forces are caused by the harder outer housing 4 compressing counterforces harder inward against the object 40 with the projections 17 and enlarged ends 13 as the object 40 increases in diameter within the centermost opening 18 as it is being twisted into the centermost opening 18. The friction forces caused by the enlarged ends 13 of the projections 17 are also increased as the enlarged ends 13 are deflected to one side by the twisted insertion of the object 40 entering. A resultant counterforce is produced that prevents the object 40 from being untwisted and rotationally removed from the holder 10.

As shown in FIG. 8, the enlarged ends 13 of the projections 17 close around the object 40 inserted in the direction of the applied twisted torque 114, creating a strong bond that resists separation and prevent the pet from pulling the object 40 out from within the holder 10. The strong bond can be released when the user applies a reverse twisting motion to overcome the counterforces and eventually remove the object 40 from the holder 10.

Figure 11:
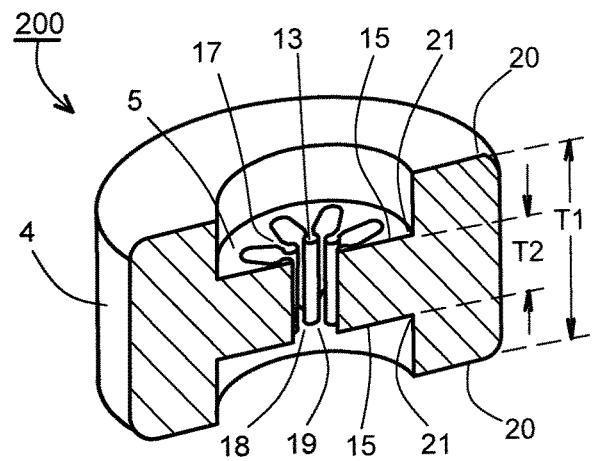
FIG. 11 is a perspective cross section view of a single piece construction of the pet treat holder according to another embodiment of the subject disclosure.

FIG. 11 shows another single piece holder 200 embodiment which is made of a single integral or unitary part. As shown, an outer perimeter shape or outer housing 4, and an inner perimeter shape or center portion 5 are composed of a single unitary construction. As shown, the inner perimeter shape of the center portion 5 has a second thickness (T2) between its outer recessed surfaces 15. The outer perimeter shape of the outer housing 4 has a first thickness (T1) between its outer surfaces 20. The inner perimeter shape of the center portion 5 is disposed within the outer perimeter shape. The second thickness (T2) is thinner than the first thickness (T1) and is countersunk into the first thickness (T1) defining shoulders 21. The inner perimeter shape of the center portion 5 has an opening 18 with a central aperture 19 located therein. As mentioned previously, although described as a centermost opening, the opening 18 may be positioned offset from the center according to this subject disclosure. The opening 18 extends through the second thickness (T2). The opening has a plurality of flexible projections 17 extending toward the central aperture 19. Each of the flexible projections 17 terminates in an enlarged tip 13. The countersunk inner recessed surfaces 15 of the center portion 5 make it more difficult for an animal to reach into the center portion 5 and dislodge an object 40 secured therein.

Similarly, and as shown in FIGS. 8 and 10, the flexible projections 17 and the enlarged tips 13 are configured to restrict removal of an object 40 when the object 40 is twisted in a first direction through the opening 18. Likewise, the flexible projections 17 and the enlarged tips 13 will release the object 40 when a sufficient force is applied to overcome a counterforce securing the object in position. When the sufficient force is applied, the object 40 is twisted in a second direction, opposite the first direction to release the object 40 from the holder 10.

Figure 12:
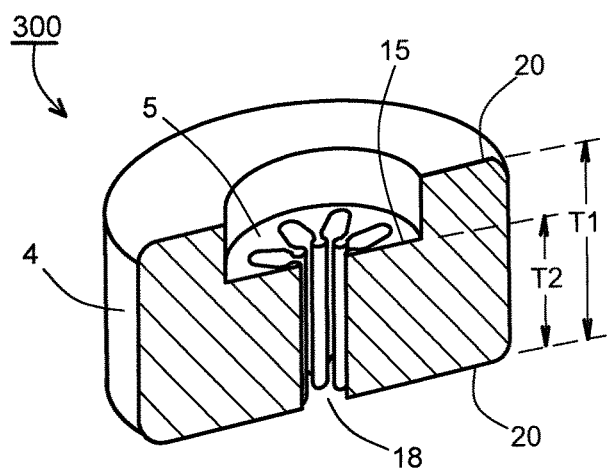
FIG. 12 is a perspective cross section view of a single piece construction of the pet treat holder according to a third embodiment of the subject disclosure.

FIG. 12 shows yet another holder 300 embodiment which is made of a single integral or unitary part. As shown, the entire holder 300, that is, the outer perimeter shape or outer housing 4, and the inner perimeter shape or center portion 5 are made of a single unitary construction. A second thickness (T2) of the inner perimeter shape of the center portion 5 is thinner than the outer perimeter shape of the first thickness (T1) of the outer housing 4. However, the lower outer surface 20 of the thickness (T2) for the lower end of the center portion 5 also shares the same surface with the outer surface 20 of the outer housing 4. However, the upper surface 15 of the center portion is countersunk below the upper outer surfaces 20 of the outer housing 4. This construction also makes it difficult for the pet to easily reach the center portion 5 when the object 40 is placed within the opening 18 and allowed to extend outward from the recessed surface 15 of the center portion 5 as also shown in FIG. 8.

Figure 13:
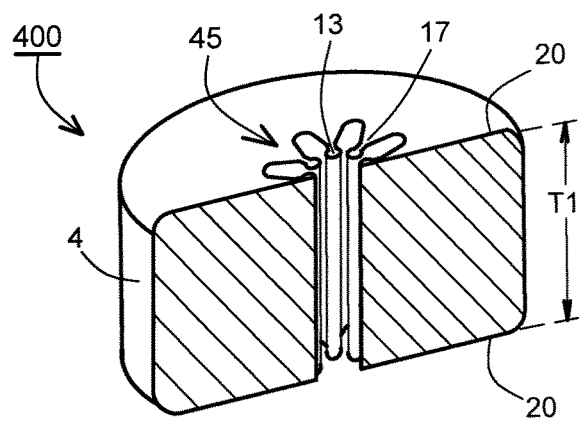
FIG. 13 is a perspective cross section view of a single piece construction of the pet treat holder according to a fourth embodiment of the subject disclosure.

FIG. 13 shows yet another holder 400 embodiment which is made of a single integral or unitary part. As shown, the entire holder 400, that is, the outer perimeter shape or outer housing 4 is inclusive of what was previously defined as the inner perimeter shape or center portion. That is, the outer housing 4 and the central portion 45 are now one and the same thickness (T1) defined between surfaces 20 and constructed as a single unitary holder 400. The holder 400 is configured as only a single thickness (T1) with a center portion 45 that includes the projections 17 and enlarged ends 13.

Figure 15:
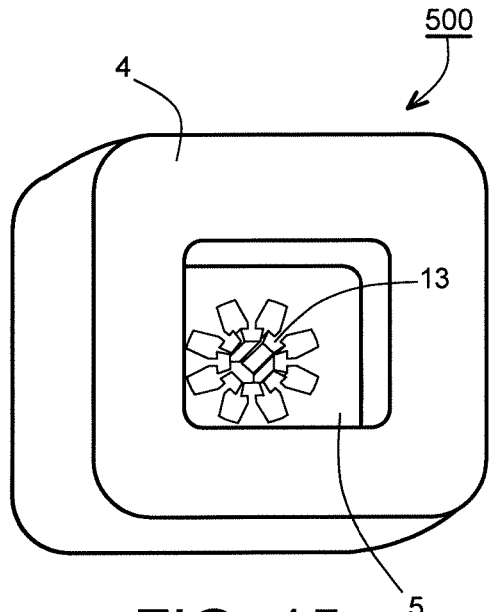
FIG. 15 is a front perspective view of the single piece construction for the pet treat holder according to the fifth embodiment of the subject disclosure.

FIGS. 14-15 illustrate another holder 500 embodiment which may be made of a single integral or unitary part. Alternatively, the holder 500 may be made of various parts and attached into a single integral or unitary part. The outer perimeter shape of the outer housing 4 is square or rectangular shaped and the inner perimeter shape or center portion 5 is also illustrated rectangular in shape.

The projections 17 and the enlarged ends 13 have a shape different from the shape of the projections 17 and the enlarged ends 13 shown in FIG. 1. For example, the outmost ends 17a of the opening defining the projections 17 are flattened, and the enlarged ends 13 are a box-like shape. Likewise, the housing 4 and the center portion 5 of the holder 400 are similar to a square shape. As mentioned above, any suitable shape is possible.

Figure 16:
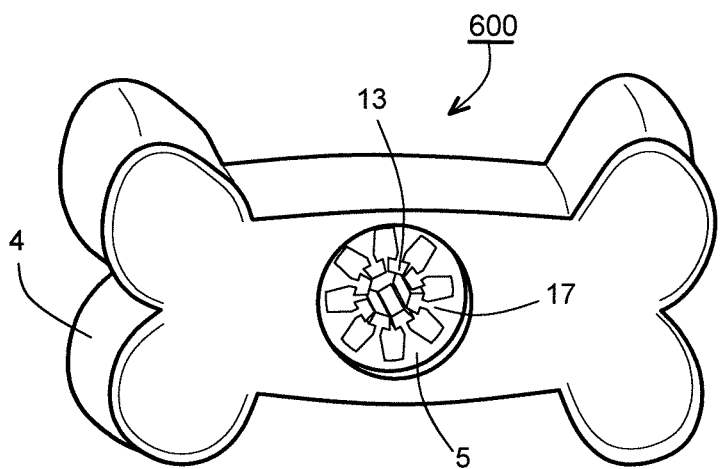
FIG. 16 is a front perspective view of a single piece construction of the pet treat holder according to a sixth embodiment of the subject disclosure.

FIG. 16 shows another holder 600 embodiment which may be made of multiple or a single integral or unitary part. As shown, the outer perimeter shape of the outer housing 4 is an obscure shape constructed as a bone. The inner perimeter shape or center portion 5 is circular in shape. The center portion 5, the projections 17 and enlarged ends 13 are also countersunk into the outer perimeter shape of the outer housing 4. As mentioned, the holders may be constructed in any suitable shape according to this disclosure.

As employed in this specification and annexed drawings, the term "or" is intended to mean an inclusive "or" rather than an exclusive "or." Moreover, articles "a" and "an" as used in the subject specification and annexed drawings should generally be construed to mean "one or more" unless specified otherwise or clear from context to be directed to a singular form.

What has been described above includes examples that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The illustrations and examples provided herein are for explanatory purposes and are not intended to limit the scope of the appended claims. It will be recognized by those skilled in the art that changes or modifications may be made to the above-described embodiment without departing from the broad inventive concepts of the subject disclosure. It is understood therefore that the subject disclosure is not limited to the particular embodiments which is described, but is intended to cover all modifications and changes within the scope and spirit of the subject disclosure.

What is claimed:

1. A pet treat holding device, comprising: a single piece holder comprising:
an outer perimeter shape having a first thickness; and
an inner perimeter shape having a second thickness and a central portion with a central aperture located therein, the central aperture extending through the second thickness, the central portion defining a plurality of flexible projections extending toward the central aperture, each of the flexible projections terminating in an enlarged tip, the flexible projections and the central aperture extend substantially symmetrical through a thickness plane, the thickness plane being located at substantially the midpoint of the first thickness and the second thickness, wherein the flexible projections and the enlarged tips are configured to:
restrict removal of an object when the object is twisted in a first direction through the central aperture; and
release the object when the object is twisted in a second direction opposite the first direction.

2. The pet treat holding device recited in claim 1, wherein the inner perimeter shape has a second thickness that is thinner than the first thickness and is countersunk into the first thickness defining a shoulder.

3. The pet treat holding device recited in claim 1, wherein the first thickness and the second thickness are the same.

4. The pet treat holding device recited in claim 1, wherein when the object is wedged through the central aperture and twisted in a first direction, removal of the object is restricted by a strong rotational counterforce.

5. The pet treat holding device recited in claim 4, wherein the flexible projections and the enlarged tips are bent in the direction of the twist and contribute to the counterforce.

6. The pet treat holding device recited in claim 1, wherein the object is a pet treat.

7. The pet treat holding device recited in claim 1, wherein the flexible projections taper inward as they extend toward the central aperture.

8. The pet treat holding device recited in claim 7, wherein the enlarged tips define shapes that are wider than the inward taper of the flexible projections.

9. The pet treat holding device recited in claim 1, wherein when the object is wedged through the central aperture and twisted in a first direction, removal of the object from the central aperture is restricted by a strong rotational counterforce and pull friction force.

10. The pet treat holding device recited in claim 9, wherein the flexible projections and the enlarged tips are bent in the direction of the twist and contribute to the counterforce.

11. A pet treat holding device, comprising: a single piece holder comprising:
an outer perimeter shape having a first thickness; and
an inner perimeter shape having a second thickness disposed within the outer perimeter shape, the second thickness being thinner than the first thickness and is countersunk into the first thickness defining a first shoulder, the inner perimeter shape having a central portion with a central aperture located therein, the central aperture extending through the second thickness, the central portion having a plurality of flexible projections extending toward the central aperture, each of the flexible projections terminating in an enlarged tip, the flexible projections and the central aperture extend substantially symmetrical through a thickness plane, the thickness plane being located at substantially the midpoint of the first thickness and the second thickness,
whereby the flexible projections and the enlarged tips are configured to:
restrict removal of an object when the object is twisted in a first direction through the central aperture; and
release the object when the object is twisted in a second direction opposite the first direction.

12. The pet treat holding device recited in claim 11, wherein the outer perimeter shape is rounded.

13. The pet treat holding device recited in claim 11, wherein the enlarged tip of each of the flexible projections is a bead-shaped tip.

14. The pet treat holding device recited in claim 11, wherein the material of the single piece holder is rubber.

15. The pet treat holding device recited in claim 11, wherein the second thickness is thinner than the first thickness and is countersunk on an opposite side into the first thickness defining a second shoulder.

16. A pet treat holding device, comprising:
a single piece holder comprising:
an outer perimeter shape having a first thickness; and an inner perimeter shape having a second thickness disposed within the outer perimeter shape, the second thickness being thinner than the first thickness and is countersunk into the first thickness defining a shoulder, the inner perimeter shape having a central portion with a central aperture located therein, the central aperture extending through the second thickness, the central portion having a plurality of flexible projections extending toward the central aperture, each of the flexible projections terminating in an enlarged tip, whereby the flexible projections with the enlarged tips and the central aperture extend substantially symmetrical through a thickness plane, the thickness plane being located at substantially the midpoint of the first thickness and the second thickness, and wherein the flexible projections with the enlarged tips are configured to:
restrict removal of a pet treat when the pet treat is wedged through the central aperture and twisted in a first direction, removal of the pet treat is restricted by a strong rotational counterforce; and
release the pet treat when the pet treat is twisted in a second direction opposite the first direction.

17. The pet treat holding device recited in claim 16, wherein the flexible projections and the enlarged tips are bent in the direction of the twist and contribute to the counterforce.

18. The pet treat holding device recited in claim 16, wherein the second thickness is thinner than the first thickness and is countersunk on an opposite side into the first thickness defining a second shoulder.

19. The pet treat holding device recited in claim 16, wherein the flexible projections taper inward as they extend toward the central aperture.

20. The pet treat holding device recited in claim 16, wherein the enlarged tips define shapes that are wider than the inward taper of the flexible projections.

* * * * *